United States Patent [19]

Crane et al.

[11] 3,906,444

[45] Sept. 16, 1975

[54] SPECIAL PEN AND SYSTEM FOR HANDWRITING RECOGNITION

[75] Inventors: Hewitt David Crane, Portola Valley; Robert Ellis Savoie, Mountain View, both of Calif.

[73] Assignee: Stanford Research Institute, Menlo Park, Calif.

[22] Filed: Oct. 11, 1973

[21] Appl. No.: 405,296

[52] U.S. Cl. ........................ 340/146.3 SY; 250/578

[51] Int. Cl.$^2$ ........................................ G06K 9/00

[58] Field of Search ......... 340/146.3 AE, 146.3 SY, 340/146.3 SG, 146.3 R, 146.3 AC, 146.3 F; 250/202, 556, 567, 578

[56] References Cited

UNITED STATES PATENTS

| | | | |
|---|---|---|---|
| 3,133,266 | 5/1964 | Frishkopf | 340/146.3 AE |
| 3,145,367 | 8/1964 | Crane | 340/146.3 SY |
| 3,182,291 | 5/1965 | Nassimbene | 340/146.3 SY |
| 3,273,124 | 9/1966 | Greanias | 340/146.3 AE |
| 3,462,548 | 8/1969 | Rinder | 340/146.3 SY |
| 3,761,877 | 9/1973 | Fernald | 340/146.3 SY |

OTHER PUBLICATIONS

Smithline, "Limited Vocabulary Script Reader," IBM Tech. Disclosure Bulletin, Vol. 7, No. 6, Nov. 1964, pp. 473–475.

*Primary Examiner*—Leo H. Boudreau
*Attorney, Agent, or Firm*—Lindenberg, Freilich, Wasserman, Rosen & Fernandez

[57] ABSTRACT

A system enabling automatic identification of a hand written signature is provided. A specimen signature is written with a special pen which will provide as output, signals representing the direction which that pen is moved to produce that signature. This information is converted into direction per unit of time which is stored at a particular address in the memory of a data processing machine. For verification of such a signature, an individual indicates to the machine, in any suitable manner, the address where his signature is stored in memory, and then proceeds to write his signature again with said pen. The direction per unit of time information which is generated at this time, is compared with the direction per unit of time read out of memory. If there is sufficient correlation, the machine indicates the signature is acceptable. If not, it indicates the signature is not acceptable.

14 Claims, 7 Drawing Figures

SPECIAL PEN AND SYSTEM FOR HANDWRITING RECOGNITION

BACKGROUND OF THE INVENTION

This invention relates to systems used for signature verification and, more particularly, to improvements therein.

A large amount of effort has been devoted to building systems for providing automatic and infallible signature verification. The parameters measured thus far include measuring the sequence of angles or direction taken by persons signing their signatures with a particular type of pen, measurement of writing pressures exceeding a predetermined pressure, the size of the characters which are written, and various combinations of these parameters. Parameters which thus far have not been used in signature verification are direction versus time parameters.

OBJECTS AND SUMMARY OF THE INVENTION

This invention uses the direction versus time parameters for signature veritication. An individual whose signature is desired to be verified first signs his name with a special pen which generates signals representative of the instantaneous directions taken by the pen in the course of writing the signature. The direction $\theta$ of writing is derived from vertical and horizontal components Y and X of the directions, by dividing Y by X and taking the arc tan function. The result of the division is applied to an analog to digital (A to D) converter. The A to D converter is clocked so that digital numbers are provided at clock intervals, which digital numbers represent a function tan $\theta$, in which $\theta$ indicates the direction being taken by the pen at a particular time. An additional circuit converts the digital numbers representing tan $\theta$ into digital numbers representing $\theta$.

The train of digital numbers corresponding to the $\theta$ values generated during the writing of the signature, are stored in the memory of a computer or data processing machine at a particular address. The individual who has just signed his name is provided with this address. The form in which the address is given to him is determined by the type of input to the machine. If the machine has a keyboard entry system, which can be used for indicating an address to the memory for read out, then it is given to him orally. If the address input to the machine is on a punch card or magnetically encoded card, then this will be provided.

For subsequent verification of a signature, the individual inputs the address of his signature into the data processing machine, and then proceeds to write his name with the previously indicated special pen. This time, the signature, which is just written, is processed by the data processing machine in the manner indicated for the original signature except that it is not stored in memory but rather, it is entered into the machine in the form of a train of digital signals representative of the values of $\theta$ at each clock interval. Since writing the second signature within the identical interval as the first signature is almost an impossibility, the data processing machine normalizes the signature just written. That is, it spreads the $\theta$ samples over the same interval as the interval taken for the original signature, which interval is also recorded in digital form in memory along with the original signature. The normalized signal is then compared with the $\theta$ samples read from memory, and if they correlate to an acceptable degree, then the machine indicates that the signature is acceptable. Otherwise, it indicates that it is not acceptable.

It is also within the scope of this invention to use the X and/or Y versus time signals alone or together with the $\theta$ signals, for signature identification in the manner described above for $\theta$ versus time. These components are also considered as indicative of the "direction" taken by the pen at any instant in writing the signature.

DESCRIPTION OF THE PREFERRED EMBODIMENTS

Figure 1:
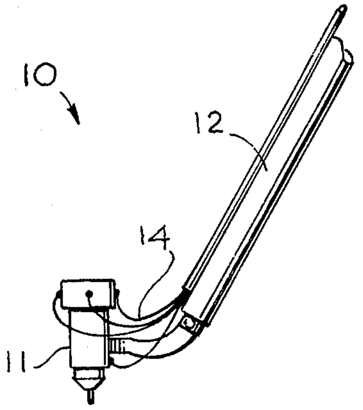
FIG. 1 is a drawing illustrating the external appearance of a pen which may be employed with this invention.

Referring now to FIG. 1, there may be seen a representation of a pen 10 which may be employed with this invention. The arrangement shown should not be construed as a limitation upon the invention. What is required of the pen which is to be used herewith is that, when it is grasped for writing, it must be held so that it will generate vertical and horizontal signals when it is moved correspondingly vertically (toward or away from the writer) or horizontally (left or right). The arrangement shown in FIG. 1 is a suitable arrangement for insuring this. The writing portion 11 of the pen is vertical and the portion 12, which is grasped by the hand when it is desired to write, joins the writing portion at some suitable angle which is adjustable for the individual although the axis of portion 12 preferably intersects the writing point. Leads 14 extend from the top of the writing portion within the barrel to apparatus which will be described subsequently herein.

Figure 2:
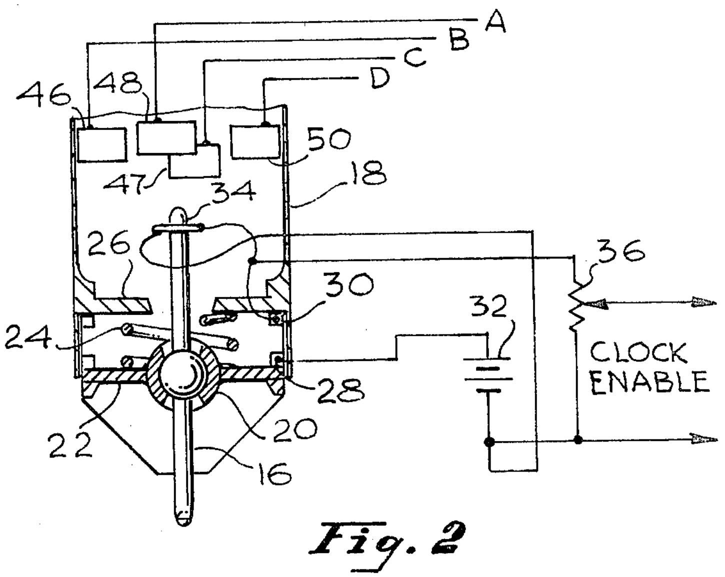
FIG. 2 is an enlarged cross-sectional view of the writing and signal generating portion of the pen.

FIG. 2 shows an enlarged cross-section of the vertical or writing portion of the pen. It comprises a ball-point ink cartridge 16, which extends from a housing 18, to afford writing. At a suitable distance from the ball-point end, there is a ball and socket joint 20, whereby the ball-point cartridge 16 may be held so that it is free to swivel, to a limited extent, in a direction determined by the motion of the pen when used for writing.

The swivel joint 20 is supported centrally on a shelf 22, which is attached to one end of a spring 24, with which the shelf carrying the swivel is free to move in a direction to compress the spring when the pen is pushed against paper for the act of writing. The other end of the spring is attached to stationary shelf 26, and when the pen is pressed down for the act of writing, the stationary shelf 26 serves to stop the upward movement of the movable shelf 22.

The movable shelf 22 contains a contact 28. When the movable shelf 22 is moved upward, it is arrested in its motion by the stationary shelf 26, at which time contacts 28 and 30 can make connection. Contact 28 is connected to one side of a power supply 32. Contact 30 is connected to one side of a light emitting diode 34. The other side of the light emitting diode is connected to the other side of the power supply 32. A potentiometer 36 is connected from said one side of the light emitting diode 34 to the other side of the power supply 32. Therefore, when contacts 28 and 30 close, a voltage signal is provided indicative of the fact that the pen has been pressed against paper for the purpose of writing. This signal is taken from a tap on the potentiometer 36 and is identified as a clock enable signal. The light emitting diode 34 is held at the nonwriting end of the ball-point cartridge 16. Accordingly, when the pen is pressed on paper for the purpose of writing, the light emitting diode is provided with sufficient current to enable it to emit light and a voltage is established at the potentiometer 36, which is hereafter called the clock enable signal.

In the upper end of the barrel 18, there are quadrantially positioned four photodiodes respectively designated by reference numerals 46, 47, 48, and 50. The leads from these photodiodes are designated as A, B, C, and D, respectively representative of quadrantial signals A, B, C, and D, which are derived therefrom. While the photodiodes are represented separately a single "quadrant" type photocell may be used. This is a photocell which has its sensitive surface divided into four quadrants, from which four separate signals may be derived. This is schematically shown in FIG. 3.

As the pen is used for writing a signature, and as the ink cartridge 16 pivots in response to the act of writing, the photodiodes will be illuminated, as determined by the angle which the ink cartridge assumes in response to what is being written.

Figure 3:
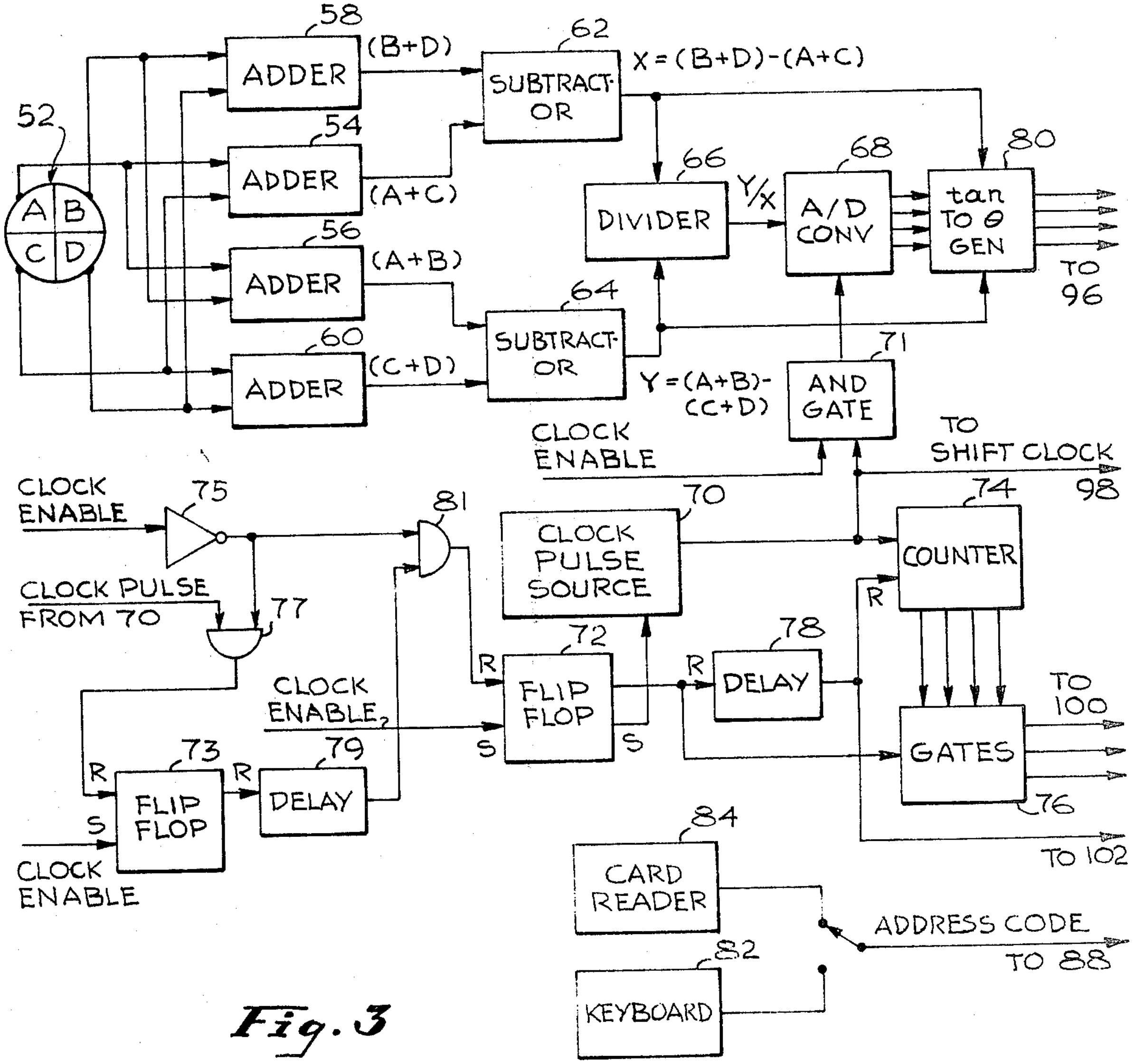
FIG. 3 is a block schematic drawing of the input circuits to a data processing machine, which may be employed with this invention.

FIG. 3 is a block schematic diagram of the input apparatus which may be employed in accordance with this invention for generating X and Y signals which are converted to $\theta$ signals. These may be used to represent a cursive signature. The four photocells 46, 47, 48, and 50 shown in FIG. 2 are combined into a single quadrantial photocell 52. The quadrantial photocell 52 has its quadrants designated as A, B, C, and D corresponding to the leads A, B, C, and D shown in FIG. 2. These may be considered as the quadrantial areas which, when illuminated by the light emitting diode, provide output signals A, B, C, and D. Effectively, the photocell 52 may be considered as representing a top view of the barrel 18, showing the regions covered by four photodiodes positioned therein.

Signal A, from the photodiode 48, is applied to adders 54 and 56. Signal B, from photodiode 46, is applied to adders 58 and 56. The D signal, which is derived from photodiode 50, is applied to adders 58 and 60. The C signal, which is derived from the fourth photodiode, is applied to adders 54 and 60.

The output of adder 58, which is $(B + D)$, is applied to a subtractor 62, from which is subtracted the output of adder 54, $(A + C)$. The output of subtractor 62 is a signal representative of motion in the X direction.

The output of adder 56, $(A + B)$, is applied to a subtractor 64 to which there is also applied to output of adder 60, $(C + D)$. The output of subtractor 64 is a signal representative of motion in the Y direction.

The output of the subtractors 62 and 64, is applied to a divider 66, whose output $(Y/X)$ is the tangent of the angle $\theta$. This output is applied to an analog to digital converter 68, which converts the analog value of the tangent of $\theta$ to a digital value. This A to D converter is only enabled to sample the outputs of the divider when it receives clock pulses through an AND gate 71 from a clock pulse source 70. AND gate 71 is enabled in the presence of a clock enable signal from potentiometer 34. The clock pulse source is enabled only while it is receiving the set output of a flip flop 72. The clock enable signal sets flip flop 72. The clock enable signal also sets a flip flop 73. This flip flop 73 stays set until the clock enable signal is turned off, by reason of the pen being lifted from the paper. When this happens, an inverter 75 output goes high and is applied to an AND gate 77. The next clock pulse, which is also applied to AND gate 77, resets flip flop 73. The reset output of flip flop 73 is applied to a delay circuit 79. The duration of the delay provided should be just long enough for "pen up" situations to allow for crossing t's or dotting i's. This can be on the order of a fraction of a second to a few seconds. During the "pen up" interval no $\theta$ samples are taken and zeroes are entered into the system. It may be desirable to stop counting during "pen up" intervals. In this invent, the counter 74 may also be driven by the output of gate 71, instead directly from the clock pulse source 70, as shown. If the clock enable signal occurs before the end of the delay period, flip flop 73 is once again set and nothing further happens. If no clock enable signal occurs before the end of the delay period, then the output of the delay circuit 79 is applied to an AND gate 81. The enabling input to this AND gate is the output of the inverter 75, when there is no clock enable signal applied to its input. This results in an output from AND gate 81, which resets flip flop 72.

At the time that the clock pulse source 70 is turned on by flip flop 72, its output is applied not only to the A to D converter to enable it to sample the output of the divider 66 during clock pulse intervals, but also its output is applied to a counter 74. The purpose of the counter is to count the number of samples which are taken by counting the number of clock pulses which occur over the entire interval or duration of the writing of the signature which is sought to be identified. At the end of this interval, when the clock enable signal across resistor 44 terminates, flip flop 72 is reset in the manner previously described. Flip flop 72 reset output enables a plurality of gates 76, whereby they can transfer the count of the counter 74 at that time into a suitable buffer store in the data processing portion of this invention. Within a suitable delay interval, sufficient for the transfer of this count to take place, the output of a delay circuit 78, to which the reset output of flip flop 72 is applied, resets the counter 74 to its initial state.

The output of the A to D converter and the X and Y signals are applied to a circuit 80 for converting these digital numbers, representing tan $\theta$, to a digital number representing the angle $\theta$. The output of this tan to $\theta$ generating circuit, 80, is applied to the data processing portion of this invention. The circuit 80 may be one of the well known read only memory types used in calculators for converting data in the form of a number indicative of tan $\theta$ to a number indicative of $\theta$.

Prior to writing a signature for verification, the individual who desires his signature to be verified, enters an address number, either into a keyboard 82, which is then used to apply the address code to the data processing portion of the machine, or, he is provided with a punched card, or magnetic card, which is inserted into a card reader 84. Its output then applies the address code to the data processing portion of the invention.

Figure 4:
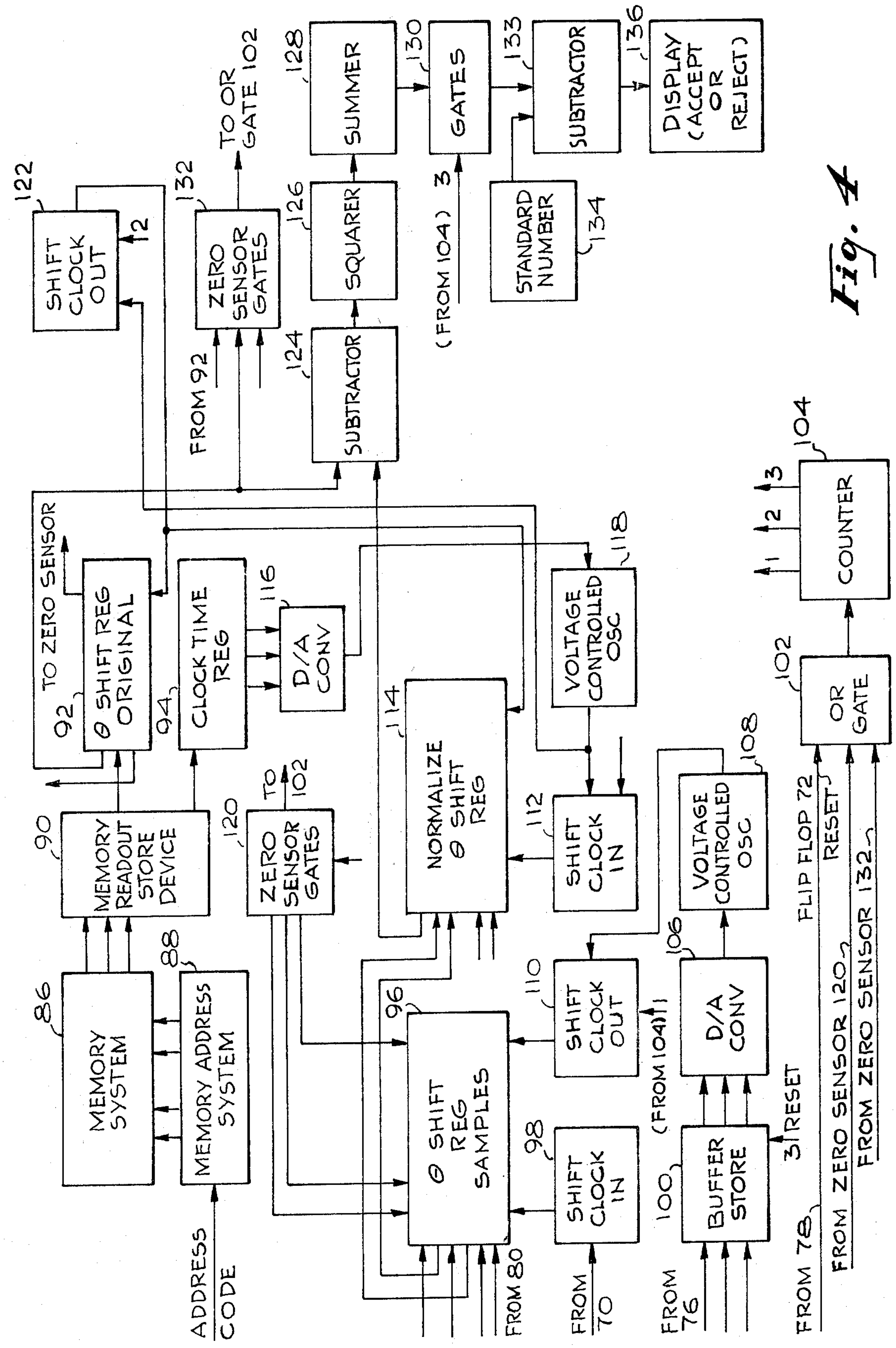
FIG. 4 is a block schematic drawing exemplary of a circuit arrangement for a data processing machine which is used to verify whether or not a signature is acceptable.

FIG. 4 is a block schematic diagram of the data processing portion of this invention. A memory system 86, which may be any of the well known content addressable memories, has previously stored therein $\theta$ samples which are obtained in the manner which has just been described, together with a number representative of the output of a counter, such as 74, indicative of the number of $\theta$ samples which have been taken. These $\theta$ samples and their associated count numbers are stored in locations in the memory system whose address is given to the individual whose signature is to be verified. The address, which has been entered, either by way of a keyboard or a card reader, is entered into the memory address system 88, of the memory system, in response to which the $\theta$ samples and the associated number are read out from the location addressed into a memory read out storage device 90, which can be any of the well known buffer storage devices. The information is then restored into the memory, if the memory is one of the type, such as magnetic core memory, which requires rewriting of the information which has just been read out, if it is to be maintained in store. The $\theta$ data is also transferred from the memory read out store device into a $\theta$ shift register 92. The associated count number is also transferred into a clock time register 94.

The output of the tan to $\theta$ generator 80 is entered into a $\theta$ shift register 96. Signals from the clock pulse source 70, are applied to a "shift clock" generator 98, to enable the transfer of these samples into the $\theta$ shift register 96.

The output of the gates 76, are entered into a buffer store 100. This represents the number of $\theta$ samples which have been taken.

The delayed reset output of the flip flop 72, is applied to an OR gate 102, whose output is applied to a counter 104. In response to the output of the OR gate 102, counter 104 is set into its number "one" state.

The output of the buffer store 100, which is a digital number representative of the number of $\theta$ samples in the shift register 96, is converted into an analog value by a D to A converter 106. The output of the D to A converter 106 is applied to a voltage controlled oscillator 108. The output of the voltage controlled oscillator, which comprises a train of signals whose frequency is determined by the count received from the counter 74, converted to shift pulses by a "shift clock our" generator out"The purpose of the "shift clock out" generator 110 is to shift the $\theta$ samples out of the same end stage of the shift register 96 as the one into which they were entered, over the same interval as was used for entering these $\theta$ samples. In other words, shift register 96 is a reversable shift register of the well known type, which permits data to be entered into or removed from the same stage at one end of the shift register. The "shift clock out" generator 110 is enabled in response to the one count of the counter 104.

A "shift clock in" circuit 112 is also enabled in response to the one count of the counter 104. It applies shift clock pulses to a "normalize $\theta$ shift register" 114. The frequency of the shift clock pulses which are applied is determined by the number which is stored in the clock time register 94, which it will be recalled, is the number representative of the $\theta$ samples taken at the time the original signature was written. The output of the clock time register 94 is applied to a D to A converter 116. The output of the D to A converter, which is a voltage representative of this number, is applied to a voltage controlled oscillator 118. The output of the voltage controlled oscillator is applied to the "shift clock in" circuit 112 which converts the input into a shift clock pulse train having a frequency determined by the number in the clock time register.

Zero sensor gates 120 are connected to the $\theta$ shift registers 96 stages. When the zero sensor gates, in response to the one count of counter 104, are enabled to sense that the $\theta$ shift register is empty, or has reached zero state, the gates apply an output signal to the OR gate 102. The output of OR gate 102 then enables the counter 104 to advance to its second count state. Zero sensor gates are well known and may constitute no more than an AND gate for each stage of the shift register. The outputs of all of these are connected to a single AND gate or to a cascade of AND gates diminishing to a single AND gate, which produces an output only when all of the AND gates attached to its input are enabled. There are alternative ways to determine when the shift register is empty, such as using a counter and sensing when its count equals the number of samples in the register, thus, the system described should be regarded as exemplary and not limiting.

From the foregoing description, it should be understood that the $\theta$ shift register 96 is transferring its contents out at the same clock rate at which they have been introduced. However, the normalized $\theta$ shift register 114 is inputting these samples at the same clock rate, and with the same number of clock pulses as was used with the original signature, which was stored in memory. Therefore, on the assumption that the signature to be verified was written faster than the original signature, a number of the $\theta$ samples coming out of the shift register 96 will be repeatedly entered into the shift register 114. Thus, the shorter second signature is effectively spread over the same interval as the longer (in time) original or verification signature. If a sufficient number of samples is taken in both instances, this has the effect of interpolating the $\theta$ samples.

If the original or verification signature has been written in a shorter interval than the signature sought to be verified, then a number of samples in the signature sought to be verified are dropped. Again, if a sufficient number of samples are taken in the first place, this is of no consequence. In effect therefore, the process just described normalizes the signature whose verification is sought so that it has the same number of samples as the original signature with which verification is sought.

It should be noted, however, that if there is too great a departure between the time intervals over which an original signature and a verification signature are written, the normalization procedure described does cause invalidation of the signature to be verified.

When the zero sensor 120 causes counter 104 to assume its second count state, which is at the end of the normalization interval, the "shift clock in" circuit 112 is disenabled and the "shift clock out" circuit 122 is enabled. The output frequency of the "shift clock out" circuit 122 is determined by the output of the voltage controlled oscillator 118, which occurs at a frequency determined by the number in the clock time register 94. The output of the "shift clock out" circuit 122 is applied to the $\theta$ shift register 92, containing the original $\theta$ samples, and also to the normalize $\theta$ shift register 114. Both shift registers shift their contents out in the direction which is in reverse to the one into which they were introduced into these respective shift registers. The outputs from these two shift registers are entered into a digital subtractor circuit 124, whose outputs constitute numbers whose values indicate one by one how close the $\theta$ samples are correlated with one another. The successive outputs from the subtractor circuit 124 are introduced into a squarer circuit 126. The successive squarer circuit outputs are applied to a summer circuit 128 which adds all of its inputs. The summer circuit 128 totals all of its inputs and applies the sum to gate 130. These gates are enabled when counter 104 reaches its "count three" state to apply its outputs to another subtractor circuit 132 to have subtracted therefrom a number representative of an acceptable correlation. This number is provided by a standard number source 134. This can be a register containing a standard number, which is applied to the subtractor 132.

The output of the subtractor 133 is a negative number if the signature being verified is acceptable. If it is not, then the output is a positive number. This output is applied to a display device 136 which senses, or displays the output of subtractor 133 to indicate an acceptance or rejection of the signature sought to be verified.

Zero sensor gates 132 sense when the $\theta$ shift register has reached a zero state, or when it has transferred out its contents. At this time, zero sensor gates 132 output is applied to the OR gate 102 whose output then causes the counter 104 to go into its number three count state. This resets the buffer store 100. This count can also be used to reset any of the other circuits which may require resetting.

It should be appreciated that each of the $\theta$ samples may be multi-bit digital numbers. Accordingly, the shift registers shown in FIG. 4 represent parallel shift registers, required for parallel storing and processing the bits of the multi-bit sample numbers.

It should also be appreciated that the system shown herein for signature verification may be carried out by a properly programmed general purpose computer.

While the foregoing system has been described as deriving $\theta$ samples and using them for verification, it is also noteworthy, and to be considered to be within the scope of this invention, that X and/or Y samples may also be used for signature verification. The structure described herein for $\theta$ sample comparison may be used for X and Y sample comparison, except in that case that divider 66 and tangent to $\theta$ generator 80 shown in FIG. 3 may be omitted. Either the X output of subtractor 62 or the Y output of subtractor 64 may be applied to the A to D converter 68. The A to D converter output is applied to the buffer store 96. The memory system 86 will store either X or Y samples, plus clock time, of an original signature, depending on which one is being employed. If it is desired to use X, Y, and $\theta$ samples in any combination for verification then the equipment must be duplicated or triplicated depending on the number of variables used, or time shared. It should be understood that by the direction of a signature line, it is intended to mean $\theta$, or X or Y, or a combination thereof. In the case of long signatures, and to simplify the size of the equipment required, a signature may be broken down into parts of several letters each, and a verification conducted for each of the parts in sequence.

Figure 5:
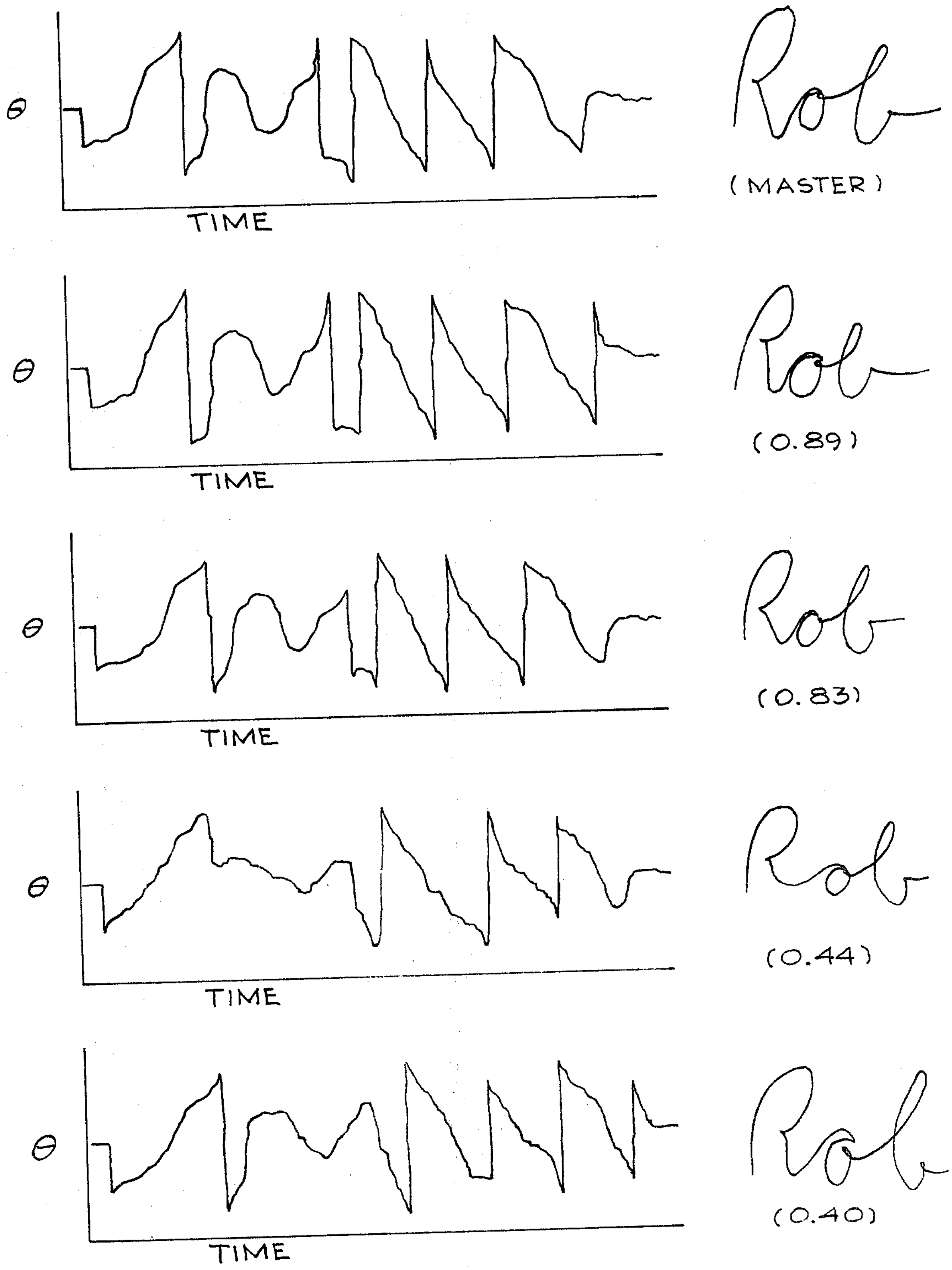
FIG. 5 illustrates five $\theta$ versus time curves for five signatures, two of which are forgeries.

FIG. 5 is shown to illustrate how, despite signature similarity, the comparison of $\theta$ can detect forgeries. FIG. 5 shows three repetitions of the name "Rob" as written by Rob, and two forgeries. The first signature was stored as a master. The second and third signatures by Rob correlated with the master with values 0.89 and 0.83 respectively. The forgeries correlated with values of 0.44 and 0.40. The five graphs adjacent to the signatures are plots of $\theta$ samples versus time. The signatures represented have all been normalized. By sighting along the drawing, it can be seen that the signatures by Rob have a strong relation, one to the other, although there are some differences in timing. It should also be noted that although the two forgeries are structurally similar to the master, there is a large variation in interval timing, as noted by the positions of the abrupt transitions. Normalization would not make up for this defect.

Figure 6:
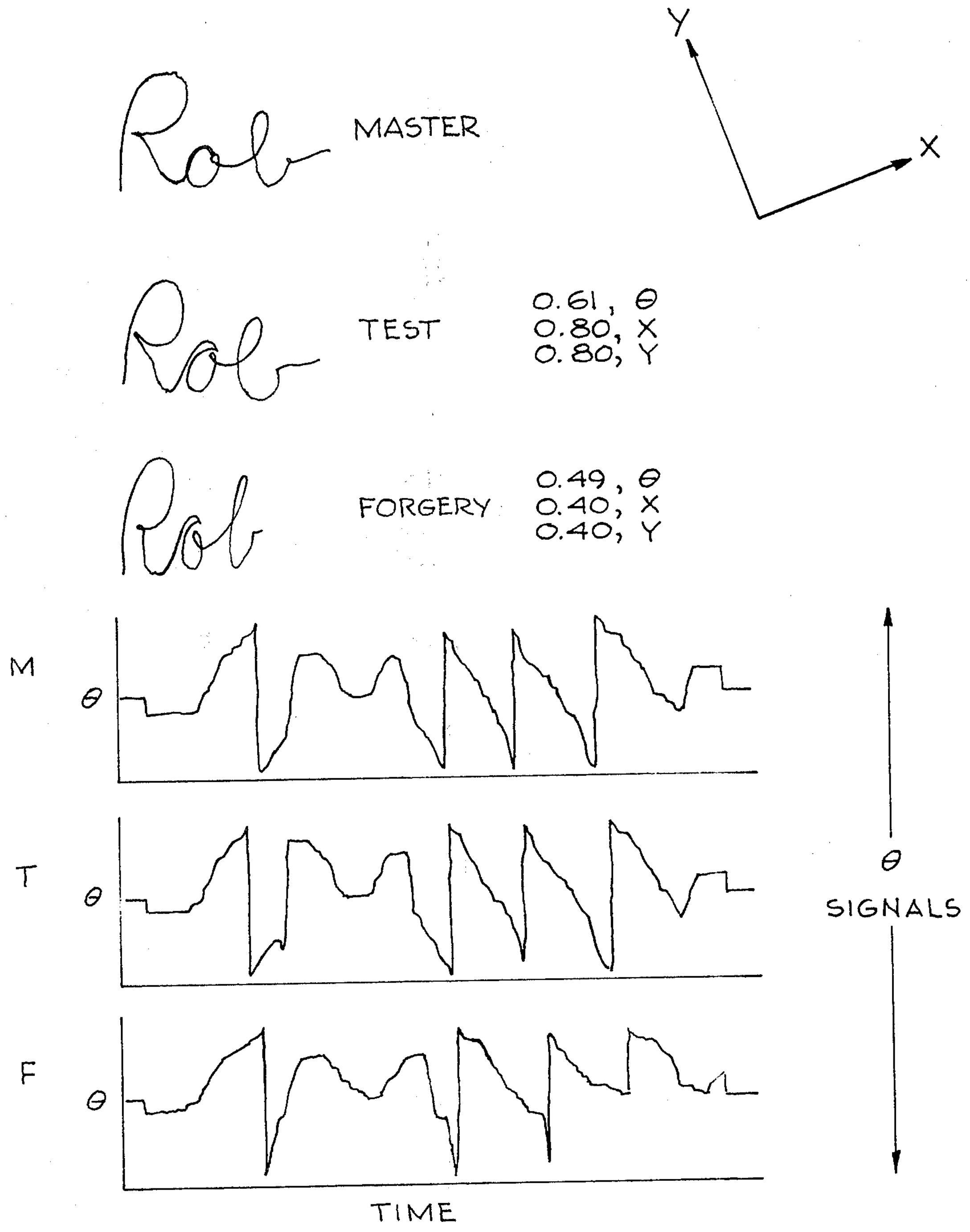
FIG. 6 shows three $\theta$ versus time curves for three signatures, one of which is a forgery.

FIG. 6 shows another master, test and forgery "Rob" signature, as well as an "M", "T" and "F" curve of $\theta$ versus time derived therefrom. The two authentic "Rob" signatures correlate at a value of 0.61 as compared with the 0.89 and 0.83 values previously. By sighting along the drawing, it is seen that this relatively low correlation of the test signature results from internal variations in velocity in writing these two samples even though the two signatures are otherwise quite similar. The forgery correlates with a maximum value of 0.49. It should be noted that the forgery is structurally fairly similar to the master, but has greater variation in inner velocity than does the test signature.

Correlation values for the signatures were also taken for X and Y along the coordinate axes noted in FIG. 6. It is interesting to note that the correlation between master and test signatures increased from 0.63 for $\theta$ to 0.80 when X or Y alone were considered, and decreased from 0.49 to 0.40 for X or Y when correlation between master and forgery signatures was made. Since $\theta = \arctan (Y/X)$, a complex interaction can be expected.

Figure 7:
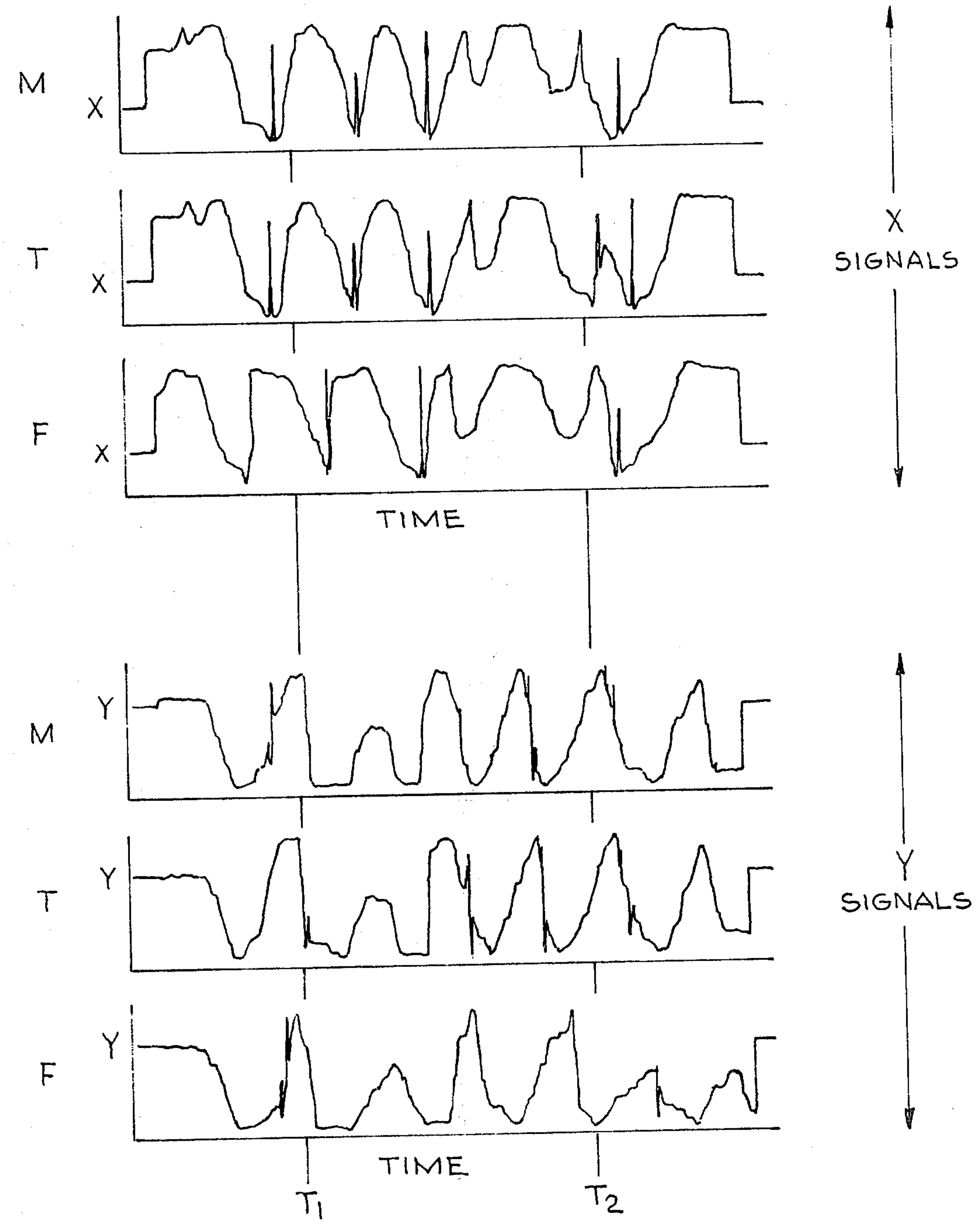
FIG. 7 shows three X versus time and three Y versus time curves for the signatures shown in FIG. 6.

FIG. 7 shows curves of the respective X and Y signals versus time for the M, T and F signatures shown in FIG. 6. Comparing the M, T and F curves for X at time $T_1$ and then for Y, one sees that there is a greater correlation between M, F and T for X than there is for Y. The point $T_1$ corresponds to a cusp of the letter "R" of the master signature. This would seem to indicate that Y correlation is more sensitive to timing variations of cusps oriented along the Y axis, than X correlation.

At time $T_2$ by contrast, the X values of the M and T signatures are much different while the Y values are approximately equal. Thus, the value of the Y correlation here is less than that of X, as contrasted to the situation at $T_1$. Thus, one might preferrably use both X and Y for optimizing verification in addition to $\theta$.

There has accordingly been described and shown herein a novel and useful signature verification system.

What is claimed is:

1. A system for verifying a signature, written with a writing instrument, with a previously written signature comprising means, responsive to the direction of motion of said writing instrument while writing said signature to generate direction signals representative thereof, means for generating clock signals, means responsive to said direction signals and said clock signals to produce first clocked direction signals only during the intervals of clock signals, means for establishing second clocked direction signals for said previously written signature, means for normalizing said first clocked direction signals with respect to said second clocked direction signals, means for comparing said normalized first clocked direction signals with said second clocked direction signals of said previously written signature and producing a verification or non-verification output signal, and means responsive to said output signal to indicate verification or non-verification.

2. A system as recited in claim 1 wherein said means responsive to the directions of motion of said writing instrument to generate direction signals representative thereof, includes light emitting means supported within said writing instrument for motion which follows the motion of said writing instrument when writing, and photocell means supported within said writing instrument for generating signals responsive to light from said light emitting means representative of the directions of motion of said light emitting means.

3. A system as recited in claim 1 wherein said means, responsive to the direction of motion of said writing instrument while writing said signature, to generate direction signals comprises quadrantial means within said writing instrument for generating first, second, third, and fourth signals respectively representative of motion by said writing instrument in each of four quadrants, means for adding first and second signals to produce a fifth signal, means for adding third and fourth signals to produce a sixth signal, means for adding said first and third signals to produce a seventh signal, means for adding said second and forth signals to produce an eighth signal, means for subtracting said fifth signal from said sixth signal to produce an X direction signal where said X direction signal represents a component of motion in one direction, and means for subtracting said seventh signal from said eighth signal to produce a Y direction signal where said Y direction signal represents a component of motion orthogonal to said component of motion in said one direction.

4. A system as recited in claim 3 wherein said means, responsive to the direction of motion of said writing instrument while writing said signature, to generate direction signals further comprises means for dividing said Y direction signal by said X direction signal to produce a tan $\theta$ signal, and means for converting said tan $\theta$ signal to a $\theta$ signal, where $\theta$ represents the angular direction of motion.

5. A system as recited in claim 1 wherein said means for normalizing said first clocked direction signals with respect to said second clocked direction signals includes means for deriving from said first clocked direction signals as many direction signals as there are in said second clocked direction signals.

6. A system for verifying a signature written with a writing instrument with a previously written signature comprising means, responsive to the direction of motion of said writing instrument while writing, for producing X signals, representative of a component of motion in one direction and Y signals representative of a component of motion in a direction orthogonal to said motion in one direction, means for dividing said Y signals by said X signals to provide tan $\theta$ signals, where $\theta$ is an angular direction signal, means for generating clock signals, means responsive to said clock signals for sampling said tan $\theta$ signals over the interval of writing said signature with said writing instrument to produce clocked tan $\theta$ signals, means for converting said clocked tan $\theta$ signals to first clocked $\theta$ signals, means for establishing second clocked $\theta$ signals for said previously written signature, means for normalizing said first clocked $\theta$ signals with respect to said second clocked $\theta$ signals, means for comparing said normalized first clocked $\theta$ signals with said second clocked $\theta$ signals and producing a verification or non-verification output signal, and means responsive to said output signal to indicate verification or non-verification

7. A system as recited in claim 6 wherein said means responsive to the direction of motion of said writing instrument while writing for producing X and Y signals includes light emitting means supported within said writing instrument for motion which follows the motion of said writing instrument when writing, and photocell means supported within said writing instrument for generating signals responsive to light from said light emitting means representative of the directions of motion of said light emitting means.

8. A system as recited in claim 6 wherein said means for normalizing said first clocked $\theta$ signals with respect to said second clocked $\theta$ signals includes means for deriving from said normalized first clocked $\theta$ signals as many clocked $\theta$ signals as there are in said second clocked $\theta$ signals.

9. A system as recited in claim 6 wherein said means for comparing said normalized first clock signals with said second clocked $\theta$ signals and producing a verification or non-verification thereof includes means for subtracting said normalized first clocked $\theta$ signals from said second clocked $\theta$ signals and producing difference signals, means for squaring said difference signals, means for summing said squared difference signals, to produce summed signals, means for establishing threshold signals, and means for subtracting said summed signals from said threshold signals to produce verification or non-verification signals.

10. The method of verifying a signature written with a writing instrument with a previously written signature comprising generating X signals representative of motion in one direction and Y signals representative of motion in a direction orthogonal to said one direction while said writing instrument is writing said signature, dividing said Y signals by said X signals to provide tan $\theta$ signals, sampling said tan $\theta$ signals with clock signals over the interval of the writing of said signature to produce clocked tan $\theta$ signals, converting said clocked tan $\theta$ signals to first clocked $\theta$ signals, establishing second clocked $\theta$ signals for said previously written signature, normalizing said first clocked $\theta$ signals with respect to said second clocked $\theta$ signals, and comparing said normalized clocked $\theta$ signals with said second clocked $\theta$ signals and producing a verification or non-verification output signal in response to said comparison.

11. A system for generating signals representative of the direction of motion taken in writing comprising a housing enclosing an elongated member having writing means on one end and light emitting means on the other end, means for movably supporting said elongated member within said housing to enable said other end on which said light emitting means is mounted to move to a position determined by the direction of motion described by said one end while writing, photocell means responsive to the light emitted by said light emitting means for generating four signals representative of each quadrant of motion described by said one end while writing, and switch means within said housing actuated responsive to writing pressure being applied to said writing means for enabling said light emitting means to become operative to emit light.

12. A system as recited in claim 11 wherein there is further included means for adding a first and second of said four signals for generating a fifth signal, means for adding a second and third of said four signals for generating a sixth signal, means for adding said first and third signals for generating a seventh signal, means for adding said second to said fourth signals for generating an eighth signal, means for subtracting said fifth signal from said sixth signal for producing an X direction signal where said X direction signal represents a component of motion in one direction, and means for subtracting said seventh signal from said eighth signal to produce a Y direction signal where said Y direction signal represents a component of motion orthogonal to said component of motion in said one direction.

13. A system as recited in claim 12 wherein there is included means for dividing said Y direction signal by said X direction signal to produce a tan $\theta$ signal, and means to convert said tan $\theta$ signal to a $\theta$ signal wherein $\theta$ represents the angular direction of motion.

14. A system as recited in claim 11 wherein said means for movably supporting said elongated member within said housing comprises a ball and socket joint, and said photocell means comprises four photocell means positioned within said housing for generating a separate signal for each quadrant illuminated by said light emitting means.

* * * * *